US008655369B2

(12) United States Patent
Chen

(10) Patent No.: US 8,655,369 B2
(45) Date of Patent: Feb. 18, 2014

(54) COGNITIVE RADIO SYSTEM USING CARE-OF-ADDRESS FOR PACKET ROUTING IN A MOBILE IP NETWORK

(75) Inventor: Kwang-Cheng Chen, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1124 days.

(21) Appl. No.: 12/258,396

(22) Filed: Oct. 25, 2008

(65) Prior Publication Data

US 2009/0111388 A1 Apr. 30, 2009

Related U.S. Application Data

(60) Provisional application No. 60/982,724, filed on Oct. 26, 2007.

(51) Int. Cl.
*H04W 72/00* (2009.01)
(52) U.S. Cl.
USPC ........ 455/454; 455/452.1; 455/509; 370/252; 370/329; 370/341; 370/343
(58) Field of Classification Search
None
See application file for complete search history.

(56) References Cited

U.S. PATENT DOCUMENTS

| 7,400,903 | B2 * | 7/2008 | Shoemake et al. | 455/552.1 |
|---|---|---|---|---|
| 7,627,326 | B1 * | 12/2009 | Miller, II | 455/454 |
| 7,881,726 | B2 * | 2/2011 | Gurney et al. | 455/552.1 |
| 8,126,473 | B1 * | 2/2012 | Kim et al. | 455/452.1 |
| 2007/0026868 | A1 * | 2/2007 | Schulz et al. | 455/454 |

FOREIGN PATENT DOCUMENTS

CN 1568086 1/2005

OTHER PUBLICATIONS

Ian F. Alyildiz et al., NeXt generation/dynamic spectrum access/cognitive radio wireless networks: A survey, May 17, 2006, Computer Networks 50, pp. 2127-2159.*
Quoc-Thinh Nguyen-Vuong et al., Terminal-Controlled Mobility Management in Heterogeneous Wireless Networks, IEEE Communications Magazine Apr. 2007, pp. 122-129.*
C. S. R. Murthy and B. S. Manoj, Ad Hoc Wireless Networks_ Architecture and Protocols, Prentice Hall, 2004, pp. 191-226.
Facilitating Opportunities for Flexible, Efficient,and Reliable Spectrum Use Employing Cognitive Radio Technologies, Authorization and Use of Software Defined Radios, Federal Communications Commission, FCC 03-322, Dec. 30, 2003.
Charles E. Perkins, Mobile IP, IEEE Communications Magazine, May 1977, vol. 35, No. 5, p. 66-82.
Fekri M. Abduljalil, Shrikant K. Bodhe, A Survey of Integrating IP Mobility Protocols and Mobile Ad Hoc Networks, IEEE Communications Surveys, 1st Quarter 2007, vol. 9, No. 1, p. 14-30.
Ian F. Akyildiz, Won-Yeol Lee, Mehmet C. Vuran, Shantidev Mohanty, Next Generation/ Dynamic Spectrum Access/Cognitive Radio Wireless Networks: A Survey, Elsevier, Science@Direct, Computer Networks, 50(2006) 2127-2159.
Ian F. Akyildiz, Xudong Wang, Weilin Wang, Wireless Mesh Networks: A Survey, Elsevier, Computer Networks, Science @Direct, 47(2005) 445-487.
CN OA issued on Aug. 23, 2011.

* cited by examiner

*Primary Examiner* — Nay A Maung
*Assistant Examiner* — Alejandro Rivero
(74) *Attorney, Agent, or Firm* — WPAT, PC; Justin King

(57) ABSTRACT

A co-existing multi-radio system and a method of establishing the same are provided. The co-existing multi-radio system includes a base station system and at least one first mobile device. The first mobile device and the base station system operate in a same communication environment. The first mobile device is capable of sensing a set of information associated to the communication environment, followed by analyzing the set of information and self-reconfiguring so as to communicate with another first mobile device and/or the base station system.

2 Claims, 5 Drawing Sheets

COGNITIVE RADIO SYSTEM USING CARE-OF-ADDRESS FOR PACKET ROUTING IN A MOBILE IP NETWORK

FIELD OF THE INVENTION

The present invention relates to a co-existing multi-radio system, and more particularly, to a co-existing multi-radio system based on cognitive radio, and a method of establishing the co-existing multi-radio system using cognitive radio.

BACKGROUND OF THE INVENTION

Since the mid-1980s, many researchers had been wishing to realize a universal wireless communication system using 3G wireless communication technology. Over the years, however, not only the universal wireless communication system remains unaccomplished, but a diversity of new communication standards has derived to satisfy actual applications based on various transmission rates and transmission distances. Among the numerous communication standards, some coexist at a same region, or transmit data using same frequency bands. For example, current prevailing Bluetooth and WiFi transmit and receive data using the 2.4 GHz band.

It is known to communication management organization of many countries that, a majority of wireless frequency bands is not at all effectively utilized although there are such numerous communication standards. For instance, most mobile phone networks world-wide are constantly fully loaded, while frequency bands used by amateur radio such as walkie-talkies are rather barely occupied. To promote overall usage efficiency of radio frequency bands, it is necessary to develop a mobile device that is compatible with multiple communication standards as well as being capable of flexibly employing various frequency bands.

Unlicensed Mobile Access (UMA) is a technology which allows seamless roaming of dual mode mobile phones between local area networks and wide area networks. The local area networks may be provided by private Bluetooth networks or 802.11 networks, and the local area networks may be Global System for Mobile communications (GSM)/General Packet Radio Service (GPRS) or Universal Mobile Telecommunication System (UMTS) mobile phone networks. The UMA technology has effectuated the concept of a wireless communication system using multiple standards and various frequency bands.

Software-Defined Radio (SDR) is regarded as a means of UMA. A fundamental principle of SDR is that, system parameters of processor platform are adjusted to achieve a single platform compatible with multiple communication standards. The processor may be a digital signal processor that generally performs transmission and reception of a physical layer.

Cognitive radio is an extension of SDR. To be more precise, cognitive radio is capable of detecting conditions such as frequency band utilization in a communication environment, and employs a reconfigurable transceiver to facilitate a mobile device to adopt appropriate communication and network capabilities. Having potentials of fully utilizing frequency bands, cognitive radio is considered as a key technique in the realm of wireless communication.

Up to the current day, technical literature on cognitive radio is mostly associated with complicated military applications, or focuses on cognitive radio concepts, simulation tools and fundamental restrictions. Further, most related researches are targeted at cognitive radio that has the ability for sensing spectrum, and more particularly, sensing spectrum of television frequency bands. According to the theory of radio, an unlicensed user is permitted to use a licensed frequency band provided that the unlicensed user does not cause any interference. However, when the licensed user comes forth, the unlicensed user is immediately blocked from that frequency band. Cognitive radio that has the ability for sensing spectrum first needs to find currently available frequency bands, followed by selecting a most suitable available frequency band satisfying the user's communication requirements. For spectrum-sensing cognitive radio, it is a vital issue as how to maintain seamless roaming while providing appropriate spectrum utilization plans.

Compared to prior art, cognitive radio having the ability for sensing spectrum indeed contributes much to frequency band utilization efficiency. However, even more versatile cognitive radio still stands as a chief development goal in the realm of wireless communication. Therefore, it is one object of the invention to provide a co-existing multi-radio system and a method of establishing the co-existing multi-radio system, in that the co-existing multi-radio system effectuates a concept of all-round cognitive radio and satisfies requirements of various communication applications.

SUMMARY OF THE INVENTION

The primary object of the invention is to provide a co-existing multi-radio system for a mobile communication device in order to fully utilize spectrum and a coexisting system/network cognitive radio structure. A concept of the cognitive radio includes sensing an overall communication environment and flexibly utilizing various coexisting communication systems.

A co-existing multi-radio system according to one embodiment of the invention comprises a base station system and at least one first mobile device. The first mobile device and the base station system operate in a same communication environment. The base station system operates in a fixed frequency band and/or an unfixed frequency band.

In the embodiment, the first mobile device is provided with cognitive radio capabilities; that is, the first mobile device is capable of sensing a set of information associated with the communication environment. The first mobile device then analyzes the set of information and self-reconfigures in order to communicate with another first mobile device and/or the base station system.

In an actual application, the base station system comprises a primary base station subsystem, and a cognitive radio base station subsystem having at least one cognitive radio base station. The cognitive radio base station senses the set of information in the foregoing communication environment, analyzes the set of information, self-reconfigures, so as to communicate with another cognitive radio base station and/or the first mobile device.

The co-existing multi-radio system according to the invention further comprises at least one second mobile device operating in the fixed frequency band. In an actual application, the first mobile device communicates directly or via the base station system with the second mobile device. The cognitive radio base station may also communicate with the second mobile device.

Therefore, the co-existing multi-radio system according to the invention provides communication interconnectivity between various base stations and mobile devices, so as to be correspondingly configured to adapt to an environment having a diversity of coexisting networks.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Building up a globalized wireless co-existing multi-radio system accommodating all sorts of applications inevitably requires tremendous resources. The process involves fundamental network establishment and replacing millions of mobile devices currently used. In contrast, it is a more practical and feasible method to develop a mobile device that is capable of learning a communication environment (e.g., available licensed/unlicensed frequency bands, and available network systems) so as to adopt appropriate communication method as desired.

Therefore, the invention regards the overall communication network as a system having coexisting and diversified standards with respect to time, frequency and space. According to the invention, unlicensed secondary users shall be facilitated to more extensively employ all kinds of available resources in time or location aspects.

Figure 1:
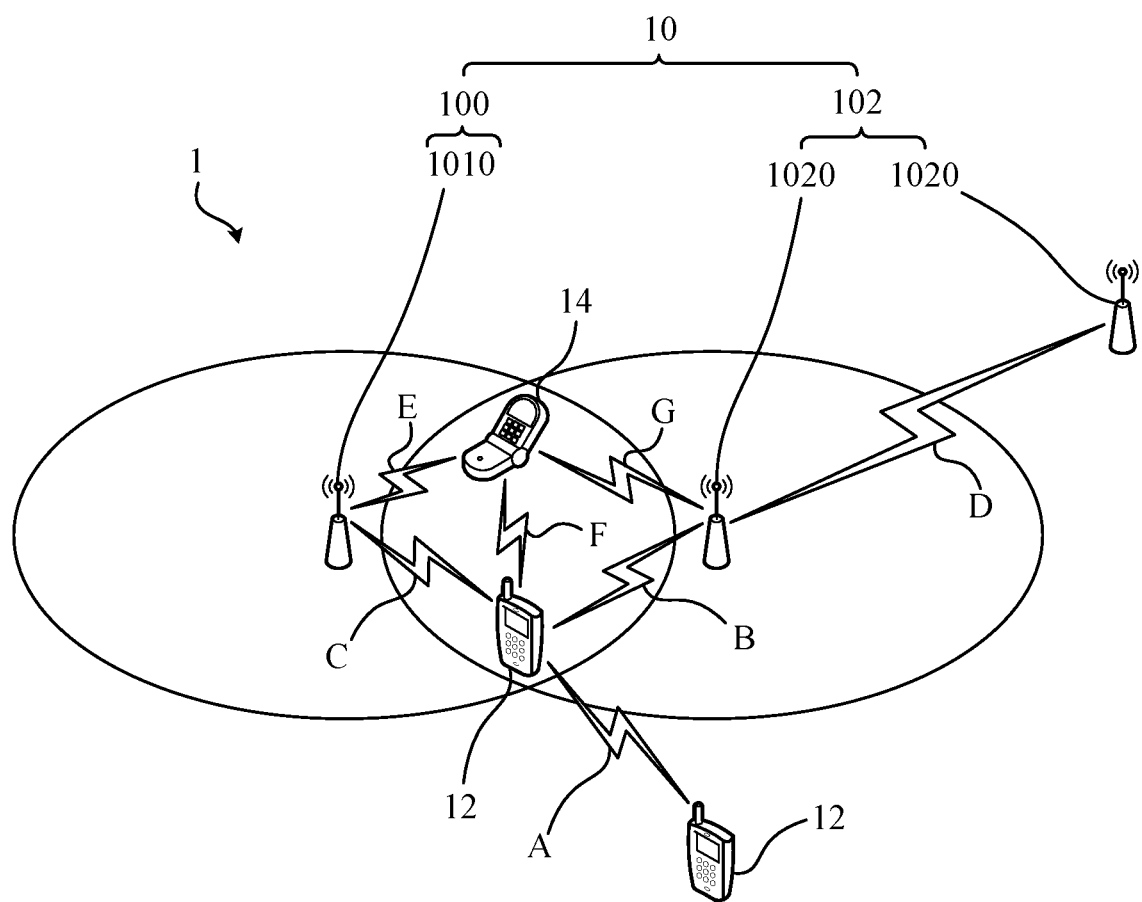
FIG. 1 is a schematic diagram of a co-existing multi-radio system according to one embodiment of the invention.

FIG. 1 shows a schematic diagram of a co-existing multi-radio system 1 according to one embodiment of the invention. The co-existing multi-radio system 1 comprises a base station system 10, first mobile devices 12 and a second mobile device 14. The base station system 10 operates in a fixed frequency band and/or an unfixed frequency band, and comprises a primary base station subsystem 100 and a cognitive radio base station subsystem 102. The primary base station subsystem 100 comprises at least one primary base station 1010. The cognitive base station subsystem 102 comprises at least one cognitive base station 1020.

FIG. 1 depicts one primary base station 1010 and two cognitive base stations 1020; however, the invention is not to be limited within. In other words, the number of the primary base station 1010 and the cognitive base station 1020 is determined by actual applications. FIG. 1 also shows two first mobile devices 12 and one second mobile device 14; however, the invention is not to be limited within. In other words, the number of the first mobile devices 12 and the second mobile device 14 is determined by actual applications. In this embodiment, the first mobile devices 12 have cognitive radio capabilities, and the second mobile device 14 is a common mobile communication device operating in a fixed frequency band. The first mobile devices 12 may self-reconfigure due to having cognitive radio capabilities so as to connect with different base stations.

In this embodiment, the primary base station subsystem 100 operates in a fixed frequency band, which is further classified into a licensed frequency band and an unlicensed frequency band. The primary base station subsystem 100 operating in the licensed frequency band has the privilege to use that frequency band. That is to say, unlicensed users can neither interfere nor occupy the licensed frequency band. Mobile devices operating in a same frequency band within an unlicensed frequency band are expected to use the band compatibly. Specifically, multiple mobile devices operating in a same unlicensed frequency band shall coexist with one another under certain regulations. Moreover, specific systems, such as radar systems, have a higher utilization priority than others.

In this embodiment, the cognitive radio base station 1020 operates in an unfixed frequency band, but dynamically uses available frequency bands without interfering the licensed base station subsystem 100, or compatibly uses unlicensed frequency bands with other systems. In a cognitive radio structure, the cognitive radio base station 1020 is a powerful component having a large memory, high computation power and unlimited energy. The cognitive radio base station 1020 provides a gateway for the first mobile devices 12 to access backbone networks, e.g., the Internet. A plurality of cognitive radio base stations 1020 may also form a mesh wireless backbone network, and act as gateways or routers when connected with wired backbone networks. If the second mobile device 14 is compatible with the cognitive radio base station 1020, the second mobile device 14 may also access the cognitive radio base station 1020.

Referring to FIG. 1, several communication types of the invention shall be illustrated.

1. Communication Link A: First Mobile Device ←→ First Mobile Device

Having cognitive radio capabilities, the first mobile device 12 is capable of sensing a set of information of a communication environment. The first mobile device 12 then analyzes the set of information and self-reconfigures so as to communicate with another first mobile device 12 by way of communication link A. For example, the two first mobile devices 12 in FIG. 1 cooperatively sense an available frequency band which may be licensed or unlicensed, and utilize the available frequency band as an operating frequency band thereof. It is to be noted that a common link for exchanging spectrum information may be necessary between the two first mobile devices 12.

Sensing the set of information in the communication environment in the aforesaid description comprises at least one step of sensing a frequency band in the communication environment, sensing a transmission protocol in the communication environment, sharing a spectrum in the communication environment, and identifying a location of the other first mobile device.

The set of information comprises at least one component of a carrier frequency of RF signals in the communication environment, a bandwidth utilization rate of the communication environment, a received signal strength indication (RSSI) of RF signals in the communication environment, and a signal-to-interference and noise ratio (SINR) of RF signals in the communication environment.

The first mobile devices 12 perform self-reconfiguration using at least one step of dynamically selecting an operating radio frequency, selecting an appropriate modulation type for use of a predetermined transmission system, and controlling a transmission power to permit interoperability between several transmission power levels.

2. Communication Link B: First Mobile Device ←→ Cognitive Radio Base Station

The cognitive radio base station 1020 senses the set of information in the communication environment, analyzes the set of information, and self-reconfigures, so as to communicate with the first mobile devices 12 by way of communication link B. For example, the cognitive radio base station 1020 dynamically senses an available frequency band in the surroundings and provides the first mobile devices 12 with one-hop access in a coverage area thereof, with a possible need of cooperative sensing techniques. Through the cognitive radio base station 1020, the first mobile devices 12 may access backbone networks or communicate with other base stations.

How the cognitive radio base station 1020 senses the set of information and self-reconfigure, and what contents the set of information contains, are the same as those previously described, and shall not be unnecessarily further discussed.

3. Communication Link C: First Mobile Device ←→ Primary Base Station Subsystem

When there is a need for a first mobile device 12 to connect to the primary base station 1010, the first mobile device 12 self-reconfigures to become a same role as the second mobile device 14, and communicates with the primary base station 1010 by way of communication link C. In other words, the first mobile devices 12 self-reconfigure to become common mobile communication devices operating in a fixed frequency band.

4. Communication Link D: Cognitive Radio Base Station ←→ Cognitive Radio Base Station The cognitive radio base station 1020 senses the set of information in the communication environment, analyzes the set of information, and self-reconfigures, so as to communicate with another cognitive radio base station 1020 by way of communication link D. Since direct wireless links are established between a plurality of cognitive radio base stations 1020, the cognitive radio base stations 1020 may then form a mesh wireless backbone network. Having cognitive capabilities, the plurality of cognitive radio base stations 1020 may dynamically select operating frequency bands and communicate with each other. For that the cognitive radio base stations 1020 are quite powerful, link capacity between the plurality of cognitive radio base stations 1020 get large as well. This type of wireless link renders a benefit of reduced cost in setting up as in certain environments, setting up the cognitive radio base station 1020 is not feasible.

5. Communication Link E: Second Mobile Device ←→ Primary Base Station Subsystem

This kind of link is a typical one-hop connection. The second mobile device 14 communicates with the primary base station subsystem 100 by way of communication link E. The primary base station 1010 is responsible for coordinating communications in a coverage area thereof, and provides the second mobile device 14 with backbone network access.

6. Communication Link F: Second Mobile Device ←→ First Mobile Device

In order to provide interoperability between different systems, this kind of link may be necessary. In this embodiment, the first mobile devices 12 self-reconfigure to communicate with the second mobile device 14 by way of communication link F. The first mobile devices 12 may also communicate with the second mobile device 14 via the base station system.

7. Communication Link G: Second Mobile Device ←→ Cognitive Radio Base Station

In order to provide interoperability between different systems, this kind of link may be necessary. If the cognitive radio base station 1020 is compatible with the second mobile device 14, the cognitive radio base station 1020 may communicate with the second mobile device 14 via communication link G. Thus, the cognitive radio base station 1020 is able to provide access to the second mobile device 14.

The co-existing multi-radio system according to the invention may be deployed in network-centric, distributed, ad hoc, and mesh architectures, and serve the needs of both licensed and unlicensed applications. Examples shall be introduced below.

1. Infrastructure Network Mode

Figure 2:
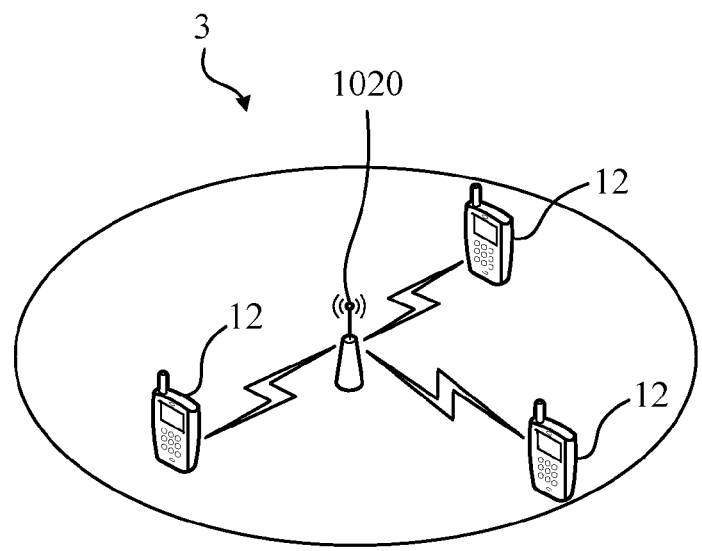
FIG. 2 is a schematic diagram of the invention implemented in an infrastructure network.

FIG. 2 shows a schematic diagram of the invention implemented in an infrastructure network 3. As shown in FIG. 2, each first mobile device 12 has one-hop connection to the cognitive radio base station 1020. The cognitive radio base station 1020 is responsible for coordinating all communications in a coverage area thereof.

2. Ad Hoc Network Mode

Figure 3:
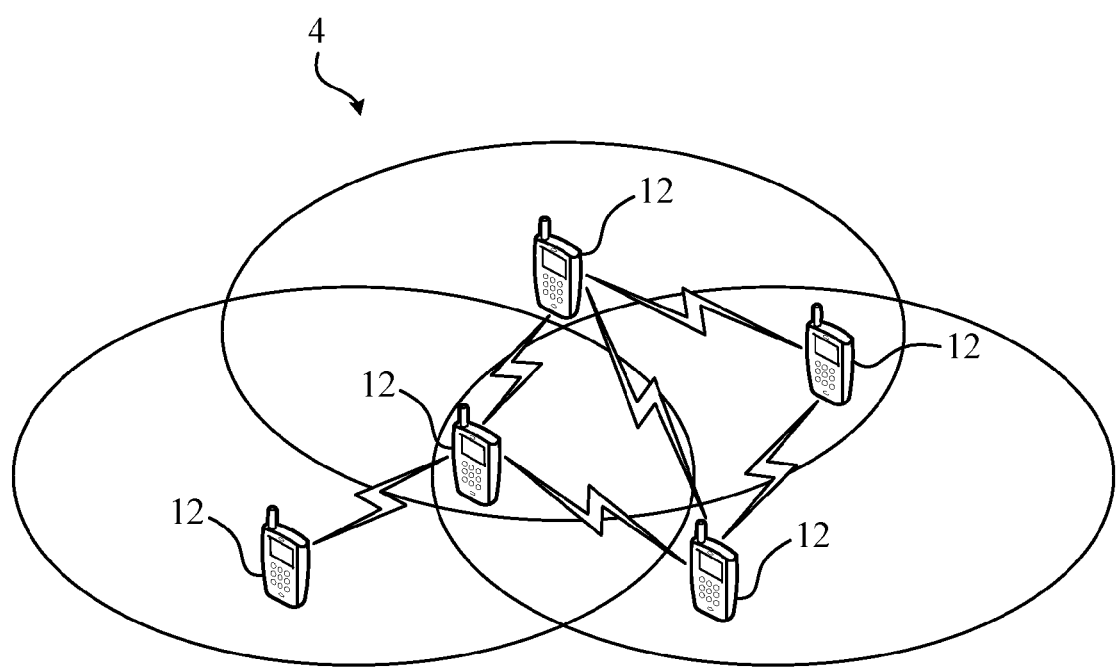
FIG. 3 is a schematic diagram of the invention implemented in an ad hoc network.

FIG. 3 shows a schematic diagram of the invention implemented in an ad hoc network 4. As shown in FIG. 3, the ad hoc network mode does not consist any fundamental structures such as base stations. When one first mobile 12 recognizes there is a connectable first mobile device 12 nearby, the first mobile devices 12 form an ad hoc network. It is to be noted that the term "connectable" means that two first mobile devices 12 can find a common available frequency band and communicate with each other without interfering licensed users of that frequency band.

3. Mesh Network Mode

Figure 4:
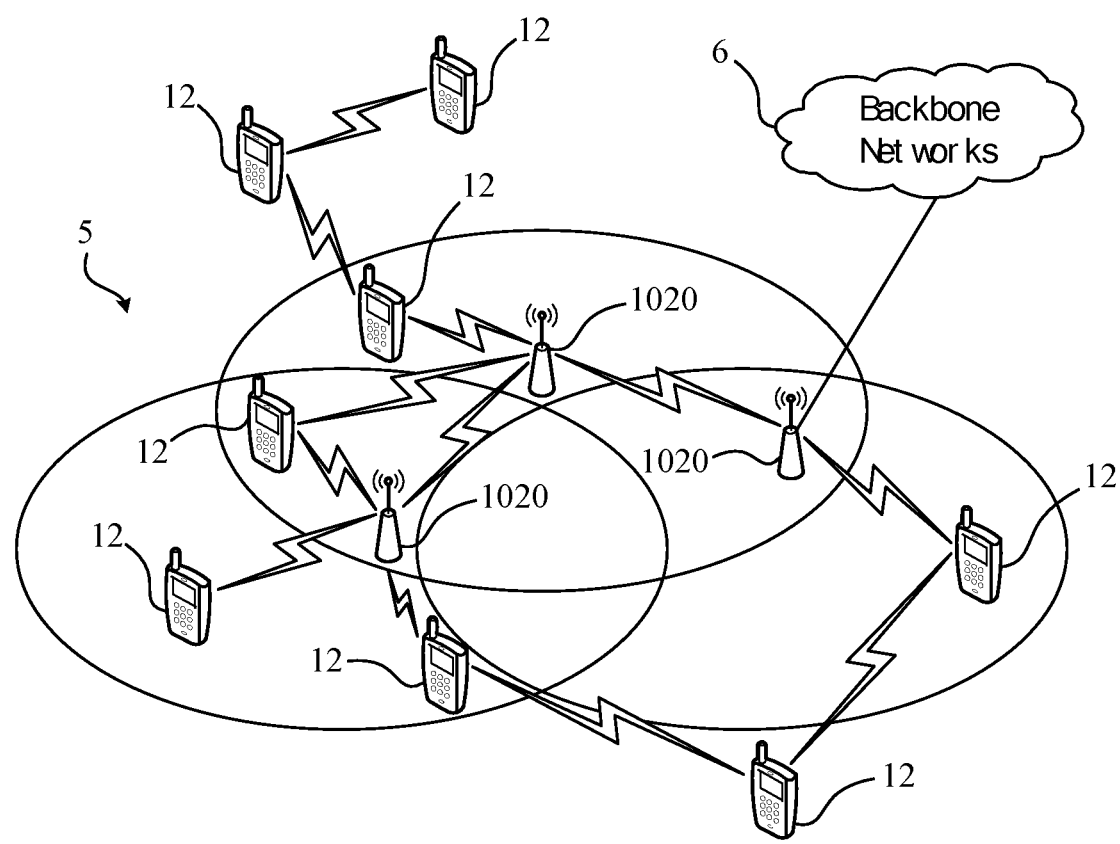
FIG. 4 is a schematic diagram of the invention implemented in a mesh network.

FIG. 4 shows a schematic diagram of the invention implemented in a mesh network 5. As shown in FIG. 4, in this mode, all the first mobile devices 12 and the cognitive radio base stations 1020 are connectable when located in each other's coverage areas. More particularly, the fixed cognitive radio base stations 1020 form a mesh wireless backbone network, and some of the cognitive radio base stations 1020 connect to a wired backbone network 6 such as the Internet. Since the cognitive radio base stations 1020 can be deployed without necessarily being connected to wired backbone networks, planning of positions of the cognitive radio base stations 1020 is made more flexible.

Figure 5:
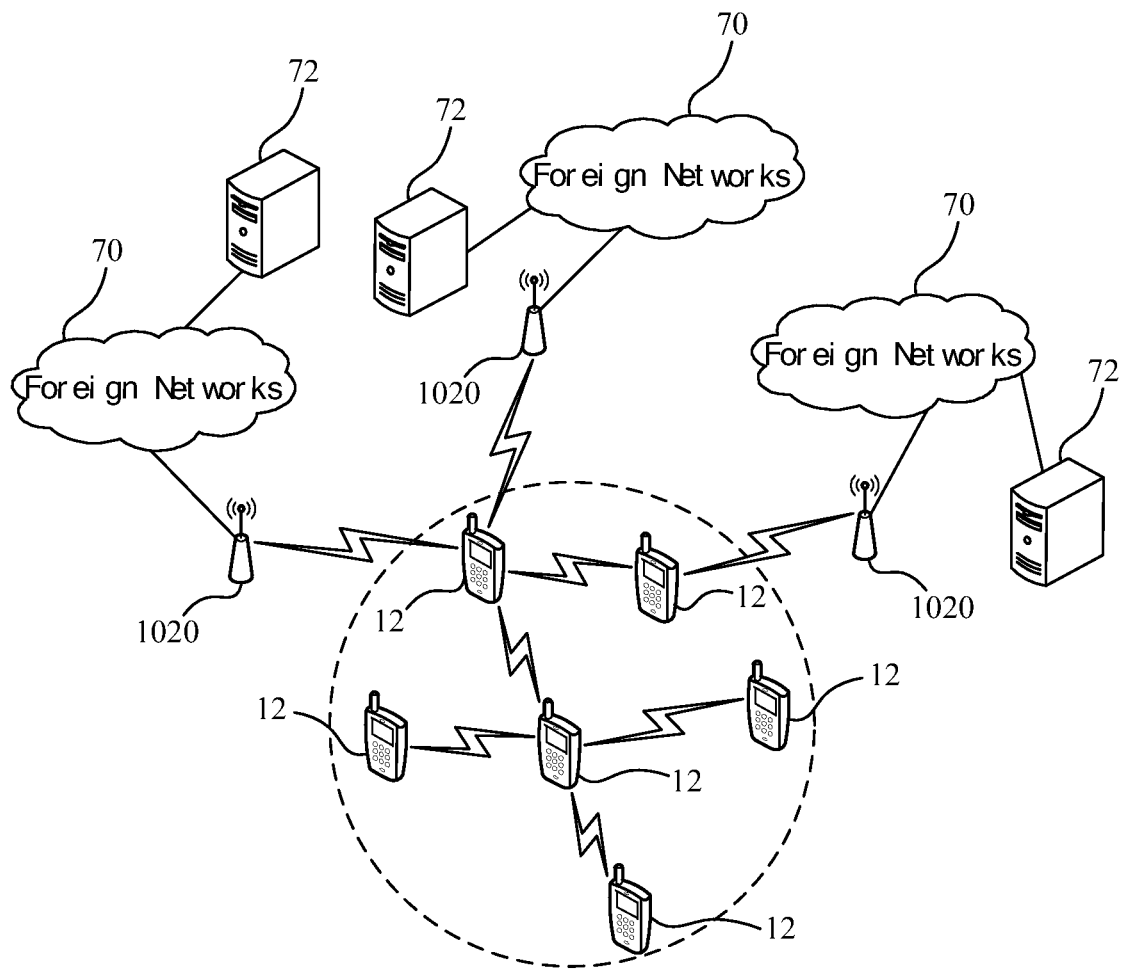
FIG. 5 is a schematic diagram of the invention integrating ad hoc networks and IP mobility management.

FIG. 5 shows a schematic diagram of the invention integrating ad hoc networks and IP mobility management. In a conventional infrastructure-based wireless communication system, only one hop exists between a base station and a mobile device. There are no links between mobile devices and no multi-hop is allowed. All mobile devices are directly connected to base stations, and thus a centralized mobility management scheme is feasible.

For example, for a mobile IP network, all cognitive radio base stations 1020 may advertise Care-of-Address (CoA) directly to the first mobile devices 12. It is easy for a mobile device 12 to acquire a CoA from a foreign network and register the CoA to a home agent (HA, not shown). Referring to FIG. 5, each first mobile device 12 may simultaneously connect to at least one wireless system, and acquires a CoA from each wireless system; or, one first mobile device 12 acquires a CoA from each wireless system via a cognitive radio base station 1020 or another first mobile device 12. The HA (not shown) then transmits all packets to the CoA of the first mobile device 12. FIG. 5 depicts three foreign networks 70 and three foreign servers 72; however, the invention is not to be limited within. The number of foreign networks and foreign servers is dependent on actual applications.

In a cognitive radio network structure, each first mobile device 12 may simultaneously connect to at least one wireless system and acquires a CoA from each wireless system, so as to route packets to/from the wireless system. Therefore, there is a need to develop new schemes to deal with multiple CoAs.

Specifically, a first mobile device 12 may acquire a CoA from each of the foreign networks 70 so that the first mobile device 12 no longer uses a single CoA to represent current location thereof and to route packets.

Referring to FIG. 5, a plurality of first mobile devices 12 form an ad hoc network, and certain first mobile devices 12 are connected to the cognitive radio base stations 1020 to access the foreign networks 70. The first mobile devices 12 that directly connect to the cognitive radio base stations 1020 are referred to as "gateway nodes". Due to limited coverage of the cognitive radio base stations 1020, some first mobile devices 12 cannot directly acquire CoAs from the cognitive radio base stations 1020. Those first mobile devices 12 outside the coverage of the cognitive radio base stations 12 then acquire the CoAs by means of the aforesaid gateway nodes to route packets to/from the foreign networks 70.

Due to the multi-hop characteristic of cognitive radio networks, handover management is not only an issue between a single mobile device and foreign networks, but also between multiple mobile devices and multiple foreign networks. For instance, suppose certain gateway nodes move away from coverage areas of the cognitive radio base stations 1020, these gateway nodes shall inform nodes in the ad hoc network about loss of connection. The nodes in the ad hoc network shall prepare to perform handover if they have active connections.

Figure 6:
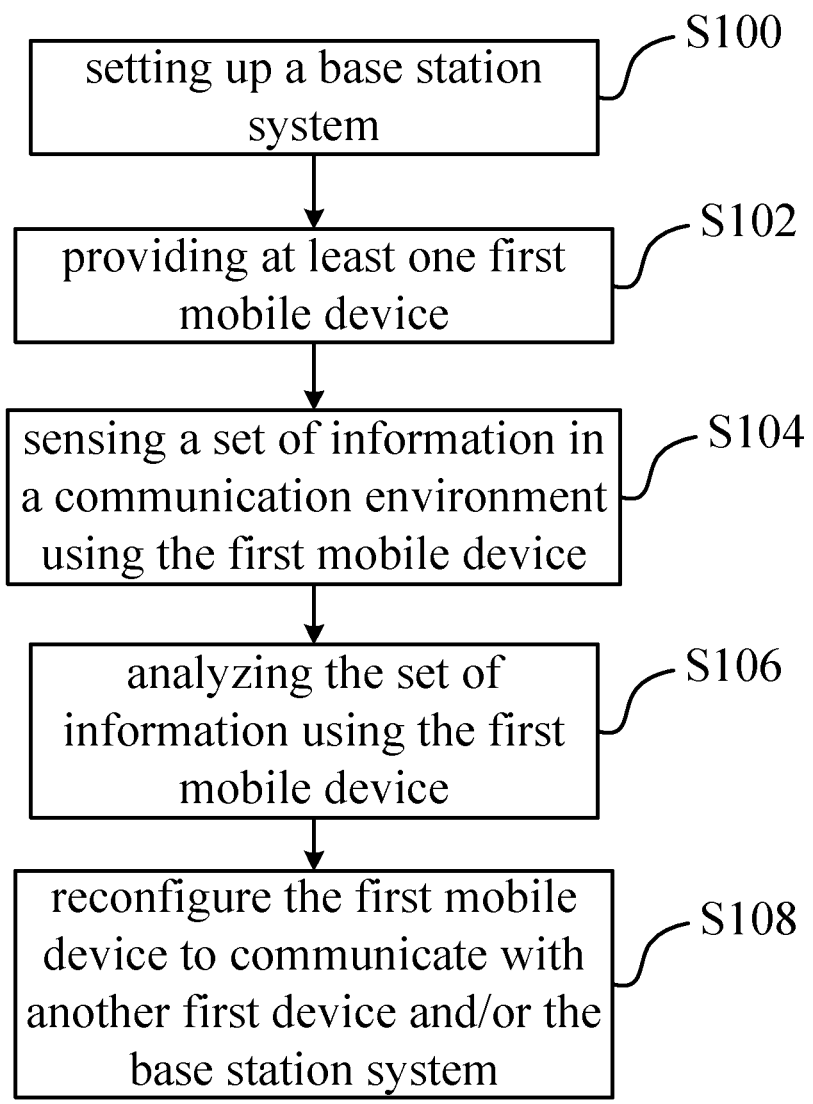
FIG. 6 is a flowchart of a method of establishing a co-existing multi-radio system according to one embodiment of the invention.

FIG. 6 shows a flowchart of a method of establishing a co-existing multi-radio system according to one embodiment of the invention.

The flow starts with Step S100 of setting up a base station system, which operates in a fixed frequency band and/or an unfixed frequency band. At Step S102, provide at least one first mobile device. At Step S104, sense a set of information in a communication environment by using the first mobile device. The first mobile device and the base station system operate in the same communication environment. At Step S106, analyze the set of information by using the first mobile device. At Step S108, reconfigure the first mobile device to communicate with another first device and/or the base station system.

It is to be noted that FIG. 6 depicts a main flow of the method of establishing the co-existing multi-radio system according to the invention. Detailed steps are as introduced in foregoing related sections, and shall not be unnecessarily further described.

As discussed, the co-existing multi-radio system and method of establishing the co-existing multi-radio system according to the invention can be applied between different base stations and mobile devices to provide communication links, and are correspondingly configured to adapt to an environment having a diversity of coexisting networks.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A co-existing multi-radio system comprising:
 a plurality of base station systems, at least one of the base station systems comprising:
  a primary base station subsystem, operating exclusively in a fixed frequency band; and
  a cognitive radio base station subsystem, operating exclusively in an unfixed frequency band;
 a plurality of first mobile devices, each first mobile device configured for:
  self-reconfiguring by selectively choosing an operating radio frequency for communication;
  choosing a modulation type for a predetermined transmission system;
  controlling a power of transmission by selectively switching among a plurality of transmission power levels;
  sensing a set of communication environment information comprising:
   a frequency band utilized in the communication environment;
   a transmission protocol utilized in the communication environment;
   a spectrum shared and received among the first mobile devices in the communication environment;
   a carrier frequency of RF signals in the communication environment;
   a bandwidth utilization rate of the communication environment;
   a received signal strength indication (RSSI) of RF signals in the communication environment; and
   a signal-to-interference and noise ratio (SINR) of RF signals in the communication environment; and
  analyzing communication environment information to selectively determine the operating radio frequency of each first mobile device;
 at least one second mobile device, in communication with at least one of the first mobile devices, either directly or via at least one base station system, operating exclusively in a fixed frequency band of the communication environment;
 wherein, each second mobile device is configured to communicate with each of the first mobile devices, the primary base station subsystem, and the cognitive radio base station subsystem;
 wherein, the plurality of base station systems are configured to communicate with each other;
 wherein, a respective one of the plurality of first mobile devices performs self-configuration to become a second mobile device when connection to the primary base station is required.

2. A method of establishing a co-existing multi-radio system, comprising the steps of:
 configuring a plurality of base station systems, at least one of the base station systems comprising:
  a primary base station subsystem, operating exclusively in a fixed frequency band; and
  a cognitive radio base station subsystem, operating exclusively in an unfixed frequency band;
 configuring a plurality of first mobile devices, each first mobile device configured for:
  self-reconfiguring by selectively choosing an operating radio frequency for communication;
  choosing a modulation type for a predetermined transmission system;
  controlling a power of transmission by selectively switching among a plurality of transmission power levels;
  sensing a set of communication environment information comprising:
   a frequency band utilized in the communication environment;
   a transmission protocol utilized in the communication environment;

sharing and receiving a spectrum shared and received among the first mobile devices in the communication environment;
a carrier frequency of RF signals in the communication environment;
a bandwidth utilization rate of the communication environment;
a received signal strength indication (RSSI) of RF signals in the communication environment; and
a signal-to-interference and noise ratio (SINR) of RF signals in the communication environment; and
analyzing communication environment information to selectively determine the operating radio frequency of each first mobile device;
configuring at least one second mobile device to be in communication with at least one of the first mobile devices, either directly or via at least one base station system, operating exclusively in a fixed frequency band of the communication environment;
wherein, each second mobile device is configured to communicate with each of the first mobile devices, the primary base station subsystem and the cognitive radio base station subsystem;
wherein, the plurality of base station systems are configured to communicate with each other;
wherein, a respective one of the plurality of first mobile devices performs self-configuration to become a second mobile device when connection to the primary base station is required.

* * * * *